INVENTOR.
HAROLD I. WOOLRIDGE
BY Marvin Moody
ATTORNEY

Jan. 24, 1956  H. I. WOOLRIDGE  2,731,853
CAM PAWL SHOCK ABSORBER
Filed June 24, 1954  2 Sheets-Sheet 2

INVENTOR.
HAROLD I. WOOLRIDGE
BY Marvin Moody
ATTORNEY

United States Patent Office 2,731,853
Patented Jan. 24, 1956

2,731,853

CAM PAWL SHOCK ABSORBER

Harold I. Woolridge, Cedar Rapids, Iowa, assignor to Collins Radio Company, Cedar Rapids, Iowa, a corporation of Iowa Application June 24, 1954, Serial No. 439,114

6 Claims. (Cl. 74—569)

This invention relates to means for absorbing the shock of a cam follower when it rides over an abrupt cam surface.

Conventionally, cams are often utilized to provide a controlled relationship between rotational and linear movement. A cam shaft provides the rotational movement while a cam follower, which rides on the cam periphery, provides the linear movement. The periphery of the cam is accordingly shaped in a manner that provides the required relationship between cam rotation and cam follower displacement.

A portion of the periphery of a cam, herein called the control periphery, is used to control follower movement. The remaining portion of the periphery, herein called the repositioning periphery, is used to reposition the follower for the following sequence of movement, since each revolution of the cam causes a repetition of the follower's displacement sequence.

Generally, follower displacement may be made more precise by increasing the length of control periphery. More control periphery may be obtained (1) by increasing the size of the cam, and/or (2) by increasing the control periphery at the expense of the repositioning periphery. Where control periphery is increased at the expense of repositioning periphery, repositioning is done over a smaller portion of periphery and accordingly becomes more abrupt.

In certain cases, it is required that a follower move smoothly over the control periphery from a low position to a high position. When almost all of the periphery is used as control periphery and very little is used as repositioning periphery, the follower must reposition itself suddenly from the high position back to the low position before it can again begin the smooth sequence up to the high position. In such case, the control periphery is a maximum when there is a radial drop from the precipice of the high position to the low position; and, of course, the repositioning periphery is then at a minimum.

In the case of a radial repositioning periphery, the follower suddenly drops from the high position or level to the low position or level, and the sudden deceleration of the follower as it contacts the low level causes shock which may profoundly shorten the life of the follower, cam and associated equipment.

Cams are used in radio tuning apparatus to actuate movable cores in tuning coils; and the cam is generally shaped to provide a linear relationship between shaft rotation and frequency. In order to provide maximum tuning sensitivity, it is required that a maximum amount of cam periphery be used as control surface. Hence the repositioning periphery is made approximately radial. This provides an abrupt change of periphery that is, in effect, a drop-off position for the follower. Radio equipment is often delicate, and the sudden fall of the follower causes undue shock which is undesirable.

It is accordingly an object of this invention to provide a means for absorbing the shock of a cam follower when it reaches a large drop-off discontinuity in cam periphery.

It is another object of this invention to provide means for increasing the life of a cam-follower combination that utilizes an abrupt change of periphery.

It is still another object of this invention to provide shock absorbing means which does not interfere with cam operation.

It is a further object of this invention to provide means which allows virtually all of the periphery of a cam to be used as control periphery.

It is a still further object of this invention to provide means which permits a cam to be designed with a radial change in its periphery.

The invention provides a spring biased pawl which moves with a cam follower. The pawl is pivotally supported and is rotationally limited by a pin that supports the pawl out of engagement with the control periphery of the cam. However, when the follower passes over the precipice of a high level of a cam, the pawl initially engages slideably and frictionally the cam periphery at the precipice. Shortly thereafter, the pawl engages slideably and frictionally the radial portion of cam periphery and pivots as the follower drops to the lower level. During the drop, pivoting by the pawl loads the pawl spring in a manner which opposes the drop of the follower and allows it to decelerate so that it engages the cam's lower level without shock. The energy stored in the spring is dissipated by friction as the pawl slides down the radial periphery. Virtually all wear occurs between the pawl and the radial periphery which is not part of the control surface of the cam. Accordingly, wear on the follower and the control periphery is minimized and their life is greatly extended.

Further objects, features and advantages will be apparent to a person skilled in the art upon further study of this specification and drawings, in which.

Figure 2:
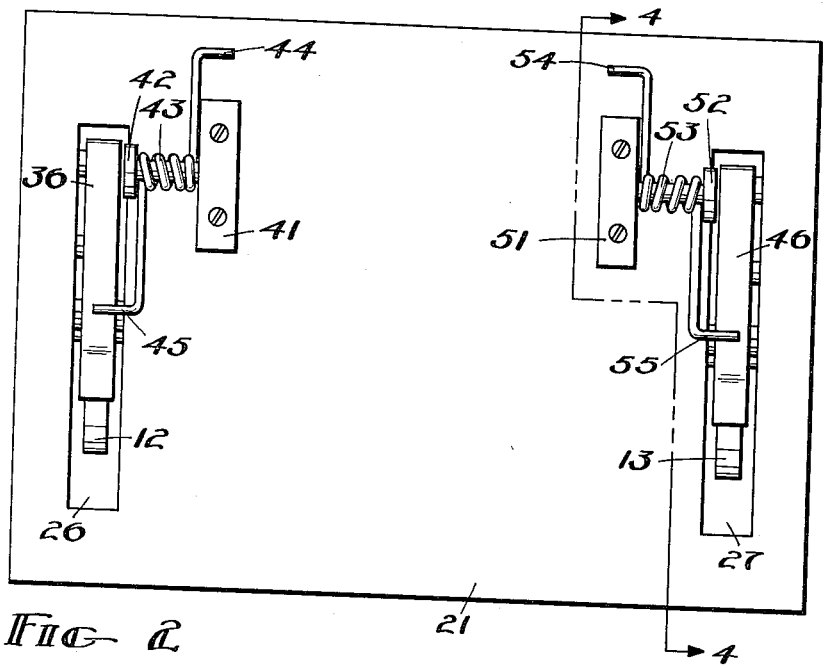
Figure 2 is a top view of the embodiment shown in Figure 1.
Figure 3:
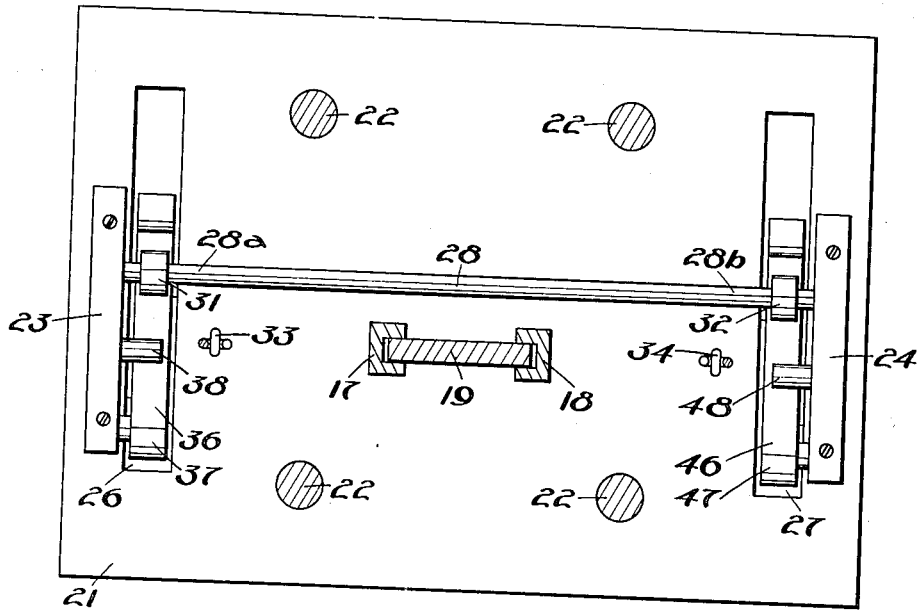
Figure 3 is a sectional view taken along line 3—3 in Figure 1.

Figures 4(a) through (d) are operational diagrams used in explaining the invention, as viewed along section 4—4 in Figure 2.

Figure 1:
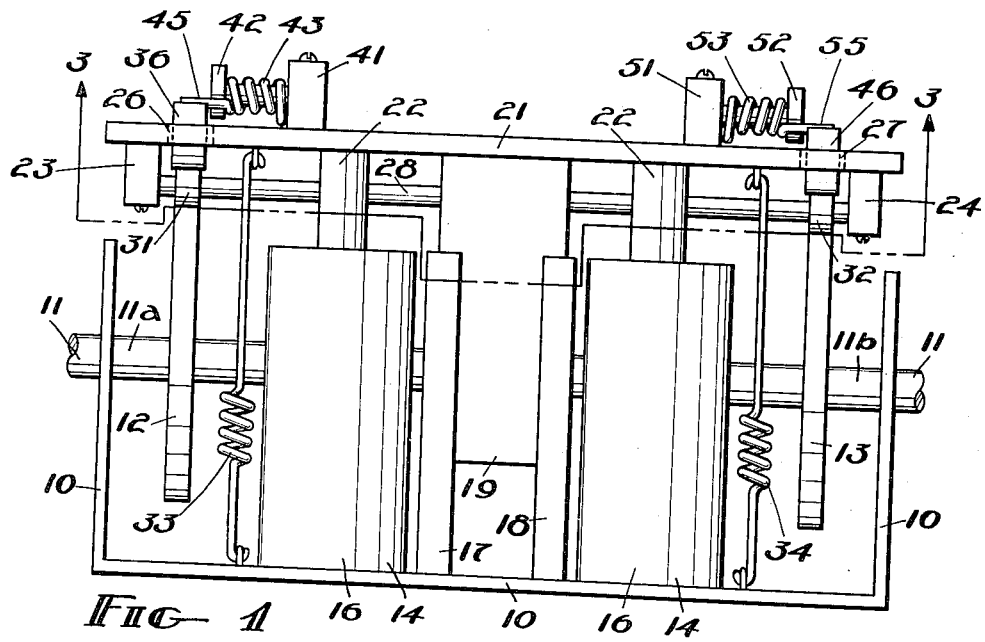
Figure 1 is an elevational view of the invention which is shown utilized in radio apparatus.

Now referring to the invention in more detail, Figure 1 shows a side elevational view of the invention as it is embodied in radio tuning apparatus. A frame 10 rotatably supports a cam shaft 11, and a pair of cams 12 and 13 are fixed to shaft 11 near its opposite ends 11(a) and 11(b). A plurality of cylindrical containers 14 are fastened at one end to frame 10 and each container 14 supports within it a tuning coil 16 (not shown).

A pair of U-shaped guides 17 and 18 are fastened at one of their ends perpendicularly to frame 10. The open sides of guides 17 and 18 face each other and receive slideably a guide plate 19 which is fastened transversely at one end to a tuning plate 21. A plurality of tuning slugs 22 are also fastened at one end to tuning plate 21, and their other ends extend axially into tuning coils 16.

A pair of lower support blocks 23 and 24 are fastened to tuning plate 21 adjacent the outer sides of a pair of rectangular openings 26 and 27 formed in plate 21.

A cam follower shaft 28 is rotatably supported at its ends 28(a) and 28(b) by blocks 23 and 24, respectively. A first cam follower 31 is fixed to shaft 28 adjacent to block 23, and a second cam follower 32 is fixed to shaft 28 adjacent block 24. A pair of frame springs 33 and 34 are fastened between frame 10 and tuning plate 21, and they spring bias cam followers 31 and 32 against the peripheries of cams 12 and 13, respectively.

A first pawl 36 is pivotally supported at one end 37 by lower support block 23 and extends, in part, through opening 26 in tuning plate 21. A stop pin 38 projects from block 23 and engages pawl 36 to prevent it from contacting follower 31. A projection 39 extends from pawl 36 on the side of follower 31 opposite from the pivoted end 37.

A first upper support block 41 is fastened to tuning plate 21 adjacent to opening 26. A capped-pin 42 projects from block 41 over opening 26 and supports a spring 43 which has L-shaped ends 44 and 45 that extend oppositely from pin 42. Spring end 44 engages the upper surface of tuning plate 21, while the other end 45 engages the upper side of pawl 36 to bias it against stop-pin 38.

In similar manner, a second pawl 46 is pivotally supported at one end 47 by the other lower support block 24 and extends, in part, through opening 27 in tuning plate 21. A stop-pin 48 projects from block 24 and engages pawl 46 to prevent it from contacting follower 32.

Also, a second upper support block 51 is fastened to tuning plate 21 adjacent the other opening 27. A capped-pin 52 projects from block 51 over opening 27 and supports a spring 53 which has L-shaped ends 54 and 55 that extend oppositely from pin 52. Spring end 54 engages the upper surface of plate 21, and the other end 55 engages the upper side of pawl 46 to bias it against stop-pin 48.

Cam 12 is best shown in Figures 4(a) through (d). Its periphery 60 is formed generally with a spiral shape which extends from a low level 61 to a high level 62. High level 62 terminates at a precipice 63 which initiates a drop-off or radial portion 64 of periphery that connects high level 62 to low level 61 and provides the repositioning periphery of cam 12. Cam 13 (not similarly shown) is identical in shape and is aligned on shaft 11 with cam 12.

The operation of cam 12 is described in detail with reference to drawings 4(a) through (d). But it is understood that the description of operation of cam 12 equally applies to cam 13 since the cams and their adjoining parts are identical. Accordingly, to avoid repetition, the operation of cam 13 is not described in detail.

Cam shaft 11 is rotated clockwise in Figure 4 by manual or mechanical means. Let it be assumed that follower 31 is initially in the position shown in Figure 4(d). As cam 12 rotates, follower 31 is displaced smoothly in a controlled manner from the low position shown in Figure 4(d), where it engages the low level 61, to the high position shown in Figure 4(a), where it engages high level 62. During this period, follower 31 is actuated by the control periphery 60 and a precise relationship is maintained between cam shaft rotation and the displacement of tuning 21 which rides with follower 31. Also during this control period, frame springs 33 and 34 are loaded, as tuning plate 21 is moved away from frame 10. Furthermore during this time, pawl 36 rests idly on stop-pin 38 due to the bias of pawl spring 43; and pawl 36 accordingly is maintained out of engagement with control periphery 60 and cam follower 31.

Eventually, follower 31 passes over precipice 63 and drops radially along periphery 64 to low level 61 where it is again ready to repeat a similar cycle with control periphery 60. Figures 4(b) and 4(c) show transient positions of follower 31 while it drops to low level 61.

Springs 33 and 34 at all times provide tension on plate 21 and maintain follower 31 biased against the periphery of cam 12, except possibly while it drops to low level 60.

Figure 4A:
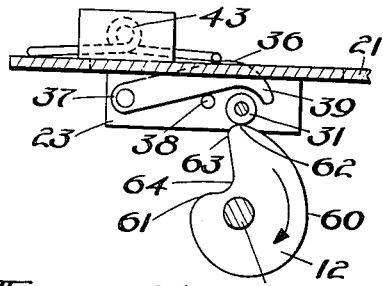
Figure 4B:
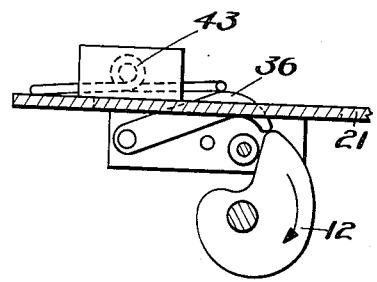
Figure 4C:
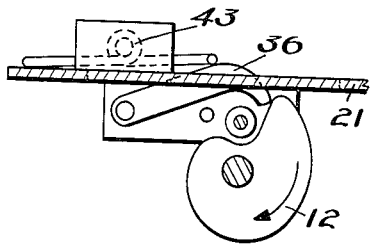

In more detail, Figure 4(a) shows cam follower 31 as it reaches the end of high level 62 where it is about to pass over precipice 63. It is noted that, at this time, stop-pin 38 maintains the end portion 39 of pawl 36 out of engagement with the cam periphery. As cam 12 rotates further, follower 31 passes over precipice 63 and begins to drop along radial periphery 64. Very shortly, pawl portion 39 contacts precipice 63; and pawl 36 pivots counterclockwise away from stop-pin 38 to load spring 43. However, tuning plate 21 drops with follower 31 and springs 33 and 34 unload. Thus during the drop of follower 31, the pawl springs are loaded and the frame springs are unloaded. The forces presented by the two types of springs oppose each other; and springs 33 and 34 aid the fall while springs 43 and 53 brake the fall. Eventually as follower 31 approaches very near to low level 61, the opposing forces of the springs virtually neutralize each other, since at that point springs 43 and 53 are loaded to a maximum and springs 33 and 34 are unloaded to a minimum. Thus, when follower 31 contacts low level 61, there is very little net force on follower 31 and very little shock occurs. It is therefore apparent that a transfer of energy occurs during the fall from the frame springs to the pawl springs.

It will be realized that the drop of followers 31 and 32 occurs very swiftly in relation to the rotation of the cams; and they have rotated only a slight amount when follower 31 contacts low level 61.

Figure 4D:
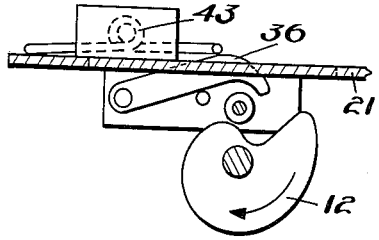

The energy released by the fall of the cam followers is uniformly dissipated during and after the fall by the sliding friction between pawl portion 39 and radial periphery 63. After pawl 12 begins pivoting, portion 39 slides downwardly against radial periphery 64 under the force of pawl spring 43. Finally, when follower 31 engages low level 61; as shown in Figure 4(d), pawl 36 has pivoted to a maximum and still is slideably engaging radial periphery 64. As cam 12 rotates further, follower 31 rides on control surface 60 along low level 61 while pawl portion 39 completes its frictional cycle with radial periphery 64 to complete the dissipation of the energy stored in the pawl springs. Pawl 36 then returns to its normal position of rest against stop-pin 38 and is held out of engagement with control periphery 60. It is ready to repeat its operation when the follower again passes over precipice 63.

The only time that pawls 36 and 46, pawl springs 43 and 53 are actuated is during the fall of the cam followers and for the period immediately following.

Virtually all of the energy released by the fall is dissipated by rubbing which occurs between pawl end 39 and radial portion 64. Wear by these elements does not effect the accuracy of the cam control function.

Since follower 31 contacts low level 61 with very little force, the invention allows only a minimum of wear to occur to follower 31 and to the control periphery at low level 61.

Roller type followers are used in this embodiment because they minimize friction, however, sliding type followers may be used if required.

It is hence apparent that this invention provides means for absorbing the shock of a cam follower when it passes over a large drop-off discontinuity in the periphery of a cam. The life of the cam-follower combination is increased accordingly. Also, the shock absorbing means of this invention in no way interferes with the operation of the cam. Furthermore, the invention permits cams to be utilized which have almost 360 degrees of control periphery since it permits the repositioning periphery to be made radial.

While a specific embodiment of the invention has been described, various changes and modifications will be obvious to those skilled in the art which do not depart from the spirit and scope of the invention.

I claim:

1. Shock absorbing means for a pair of cam followers engaging respective cams which have substantially radial repositioning peripheries and smoothly varying control peripheries comprising, a frame member, a cam shaft rotatably supported by said frame, said cams mounted on said cam shaft, a tuning plate reciprocally supported from said frame with a pair of openings formed adjacent to said cams, a pair of lower blocks fixed to said plate adjacent to said openings, a follower shaft rotatably supported by said lower blocks, said cam followers fixed to said follower shaft to engage the respective cams, spring means connected between said tuning plate and frame to maintain said followers in engagement with said cams, a pair of pawls pivotally supported by said lower blocks respectively in alignment with said openings, the pivot point of said pawls located on the leading side of said follower with respect to the rotation of said cams, a pair of pawl projections extending from said pawls adjacent each cam and follower, said projections located on the side of said followers opposite the pivot points, a pair of stop pins projecting from said lower blocks and engaging the respective pawls to maintain the projections out of engagement with said control periphery, a pair of upper blocks fixed to said tuning plates adjacent the respective openings, a pair of capped pins supported from said upper blocks over the respective openings, and a pair of springs supported by said capped pins and engaging the respective pawls to bias them against the stop pins.

2. Shock absorbing means for a cam follower which engages a cam with at least one abrupt change in periphery comprising, a frame member, a plate reciprocally supported by said frame, a lower block mounted on said plate adjacent said cam, said follower rotatably supported by said lower block to engage the periphery of said cam, biasing means connected to said plate and said frame to bias said follower against said cam, a pawl pivotally supported at one end by said lower block, said pivot located on the leading side of said follower with respect to cam rotation, a projection on said pawl extending on the opposite side of said follower from the pivoted end, said projection located adjacent said follower and said cam on the trailing side of said follower with respect to cam rotation, a stop pin fixed to said lower block and engaging said pawl to maintain said pawl projection adjacent to but disengaged from the control periphery of said cam, an upper block supported by said plate, a capped pin fixed at one end to said upper block, and a spring supported by said capped pin and engaging said pawl to bias said pawl against said stop pin.

3. Shock absorbing means for a cam follower which engages a cam with an abrupt drop in its periphery comprising, means supporting said cam follower, means biasing said follower supporting means toward said cam, a pawl pivotally supported by said follower supporting means, a stop pin fixed to said supporting means to engage said pawl and to prevent its engagement with said follower, a spring connected between said pawl and support means to bias said pawl against said stop pin, a projecting portion of said pawl located adjacent said follower on the trailing side of said follower, and said projecting portion actuated by said cam periphery when said follower passes and abrupt drop in cam periphery.

4. Shock absorbing means for a cam follower which engages a cam with a large abrupt drop in its periphery comprising, means suporting said cam follower, a pawl having a projection and pivotally supported by said means, means biasing said pawl pivotally toward the periphery of said cam, and the projection of said pawl located on the trailing side of said follower with respect to the rotation of said cam.

5. Shock absorbing means for a cam follower which engages a cam with a large control periphery and a substantially radial repositioning periphery comprising, means supporting said cam follower in engagement with said cam periphery, a pawl pivotally supported by said supporting means with the pawl pivot point on the leading side of said follower, a projecting portion of said pawl extended adjacent said cam and follower on the trailing side of said follower, and said pawl projection pivotally spring biased toward the periphery of said cam.

6. A device as in claim 3, and a stop pin fixed to said supporting means to engage said pawl and to maintain said pawl projection out of engagement with the control periphery of said cam.

References Cited in the file of this patent

UNITED STATES PATENTS

| | | |
|---|---|---|
| 1,904,799 | Palmer | Apr. 18, 1933 |
| 2,567,735 | Scott | Sept. 11, 1951 |